United States Patent
Licka (12)

(10) Patent No.: US 6,652,315 B2
(45) Date of Patent: Nov. 25, 2003

(54) PLUG-IN CONNECTION SYSTEM THAT IS ANGLED OUT FROM, MECHANICALLY FIXED TO AND ELECTRICALLY CONTACTED TO A CIRCUIT BOARD

(75) Inventor: Petr Licka, Valasske Mezirici (CZ)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/194,250

(22) Filed: Jul. 15, 2002

(65) Prior Publication Data

US 2003/0022554 A1 Jan. 30, 2003

Related U.S. Application Data

(63) Continuation of application No. PCT/EP00/13164, filed on Dec. 22, 2000.

(30) Foreign Application Priority Data

Jan. 14, 2000 (EP) .............................................. 00100742

(51) Int. Cl.[7] .......................... H01R 13/66; H01R 13/60
(52) U.S. Cl. ........................................ 439/567; 439/527
(58) Field of Search ................................ 439/567, 527, 439/76.1, 571, 572, 573, 81, 83

(56) References Cited

U.S. PATENT DOCUMENTS 4,588,854 A * 5/1986 Bailey et al. .............. 174/52.1
5,334,049 A    8/1994 Kachlic et al. ............. 439/567
5,575,663 A    11/1996 Broschard, III et al. ...... 439/79
6,086,418 A  *  7/2000 Chang ........................ 439/573
6,249,068 B1   6/2001 Knopp ........................ 310/71
6,299,492 B1 * 10/2001 Pierini et al. ............... 439/884

FOREIGN PATENT DOCUMENTS

DE      42 25 496 A1    2/1994
EP      0 538 495 A1    4/1993

* cited by examiner

*Primary Examiner*—Michael C. Zarroli
(74) *Attorney, Agent, or Firm*—Sughrue Mion, PLLC

(57) ABSTRACT

Plug-in connection system (1-3) that provides mechanically secure and dimensionally accurate connection to a printed circuit board (4) in spite of thickness differences in the boards due to tolerances. The plug-in connection system (1-3) is contacted and fixed at a defined distance and in the final assembly position thereof by a non-positive elastic bracing in relation to the top surface of the board (4) and by a positive-fit limit stop in relation to the lower side of the board (4). An elastic tongue (5), which is formed onto the plug-in connection system, is used for the non-positive bracing. This tongue (5) is also preferably configured to laterally support the plug-in connection system against lateral tilting.

22 Claims, 3 Drawing Sheets

PLUG-IN CONNECTION SYSTEM THAT IS ANGLED OUT FROM, MECHANICALLY FIXED TO AND ELECTRICALLY CONTACTED TO A CIRCUIT BOARD

This is a Continuation of International Application PCT/EP00/13164, with an international filing date of Dec. 22, 2000, which was published under PCT Article 21(2) in German, and the disclosure of which is incorporated into this application by reference.

FIELD OF AND BACKGROUND OF THE INVENTION

The invention relates to a plug-in connection system, an electrical connector plug, and an electrical motor arrangement. More particularly, the invention relates to a plug-in connector that is fixed at an angle to a printed circuit board and that is electrically contacted to the circuit board. Such plug-in connection systems are required especially for actuators in motor vehicles between motor-internal power and control connections on the one hand and a motor-external electric power and control unit on the other. The power and control unit is preferably accommodated in an electronics enclosure which is separate from the housing of the motor and which can be assembled into one unit with the motor housing by plug-in contacting. The electric motor, generally provided with a downstream gear unit, is preferably embodied as a commutator motor that is supplied by the vehicle's DC distribution system.

Prior art publications DE 42 25 496 A1 and EP 0 538 495 B1, for instance, disclose actuators that include an electric motor with an axially flanged gear unit and with a preferably paraxial supply and control unit.

European Patent EP 0538 495 B1, for instance, discloses an electronics enclosure holding a printed circuit board that is provided with the control and/or monitoring electronics for the motor. The electronics enclosure is arranged in parallel to the axis of the motor housing and is open at the end face thereof but is otherwise sealed. At its end face, the electronics enclosure can be overhung-mounted or mechanically plugged into a corresponding housing flange opening of the gear unit and/or the motor housing and can thereby also be electronically contacted thereto. When on the one hand the gear case or motor housing and on the other hand the electronics housing are mechanically interconnected, the printed circuit board equipped with its motor control and/or monitoring electronics is automatically electrically connected by means of plug-in contacts to corresponding motor connectors on a brush holder plate of the commutator motor.

U.S. Pat. No. 5,334,049 A and German Laid-Open Publication DE 694 04 215 T2 disclose an electrical plug-in connector having a housing for mounting on the surface of a printed circuit board. A separately stamped and shaped hold-down clip is mounted on the housing by means of an anchoring leg and includes a projecting spring leg with a latching mechanism that is pushed through a hole in the circuit board from the upper side such that, when the latching mechanism reaches its operating position, it is biased against the lower side of the board. This makes it possible to compensate for varying thicknesses of different printed circuit boards.

OBJECTS OF THE INVENTION

One object of the present invention is to use simple production and assembly techniques suitable for mass production to provide a component, including a printed circuit board and a plug-in connection system, that has high external dimensional accuracy, providing secure mutual mechanical fixation and electrical contacting, despite unavoidable thickness tolerances of the circuit board.

SUMMARY OF THE INVENTION

This and other objects are attained, according to one formulation of the invention, by a plug-in connection system including: an insulation body having a base edge that contacts a printed circuit board when the plug-in connection system is in a final assembly position in relation to the printed circuit board; contact paths fixed in the insulation body and having contact legs that project from the base edge of the insulation body and are positioned to be contacted with the printed circuit board in the final assembly position. The insulation body includes at least one integrally formed elastic tongue that provides an elastic bracing with respect to the printed circuit board in the final assembly position. The insulation body further includes at least one integrally formed latching element that latches to the printed circuit board and provides a limit stop contact with a corresponding latching recess in the printed circuit board in the final assembly position.

According to another formulation, the invention provides an electrical connector plug that has: at least one power contact track; a main insulation body receiving the power contact track and having one side configured to rest against a surface of a circuit board; a spring extending from and on the one side of the main insulation body, and configured to press against the surface of the circuit board; and a latch extending from and on the one side of the main insulation body, and configured to latch an opposite surface of the circuit board.

The mutual fixation and contacting between the printed circuit board and the plug-in connection system provided by the invention is particularly advantageous. Due to the mutual spring-based support of the plug-in connection system on the top surface of the board and its positive-fit limit stop with respect to the underside of the board, varying board thicknesses, on the one hand, do not affect the distance in height of the external boundaries of the insulation body of the plug-in connection system. Moreover, the invention ensures secure electrical contact between the contact legs and the corresponding conductor paths on the circuit board, as well as a mechanical mount that is free of undue stresses, even with simple mechanical production using plug-in assembly technology. This dimensional accuracy guarantees, on the one hand, secure electrical contacting when the plug-in connection system is connected to mating contacts, e.g. of a motor drive unit, particularly a commutator motor/gear drive unit of a vehicle actuator, which is supplied, for instance, by the board-side motor control and/or monitoring electronics. On the other hand, it ensures a high accuracy of fit relative to the connector shell that receives the plug-in connection system.

According to one embodiment of the invention, the insulation body component that is provided for elastic bracing, preferably in the form of an integrally molded elastic tongue, is configured to also provide lateral non-positive-fit support, to ensure sufficient support for the insulation body, which is preferably mounted so as to angle up from the circuit board.

To further secure the insulation body against lateral tipping forces, the insulation body is preferably also provided with positive-fit lateral securing elements that protect against tipping. In accordance with one embodiment of the invention, these elements are offset in height relative to the non-positive-fit lateral support, such that the external tipping forces acting on the insulation body are absorbed by the positive fit only if they exceed the counter forces of the non-positive-fit support.

BRIEF DESCRIPTION OF THE DRAWINGS

The invention as well as features and advantages thereof will now be described in greater detail with reference to schematic embodiments depicted by way of example in the drawing, in which.

DETAILED DESCRIPTION OF THE PREFERRED EMBODIMENTS

Figure 7:
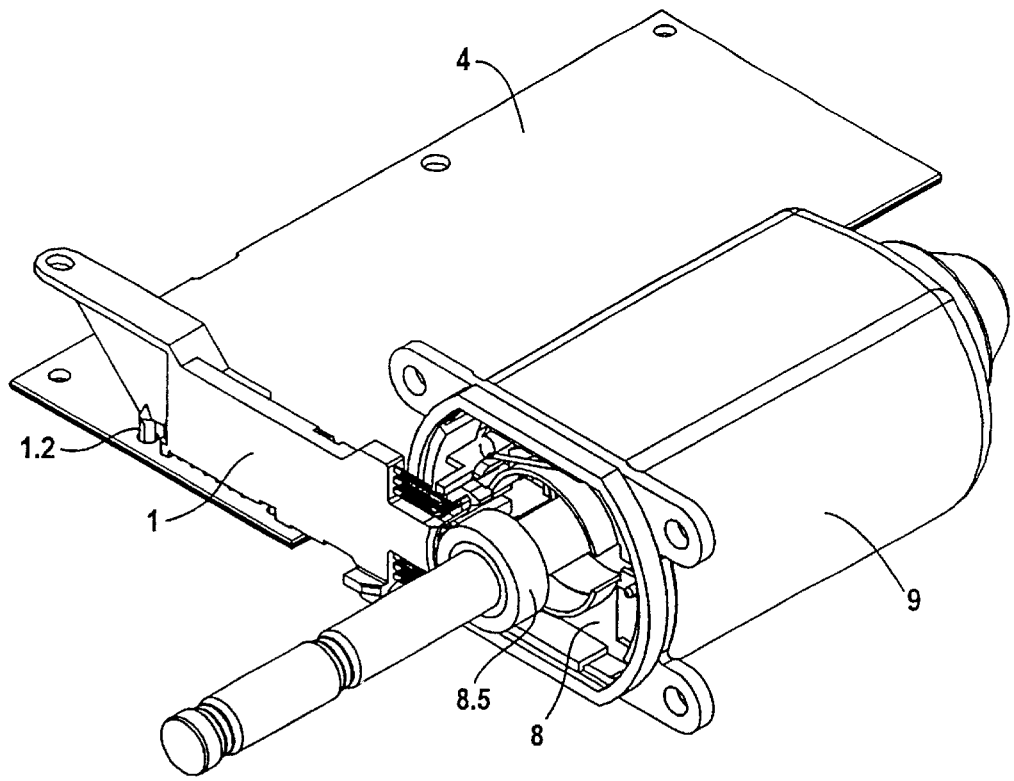
FIG. 7 is a perspective view of a plug-in connection system without the inventive measures that ensure dimensional accuracy and proper fixation and contacting, in its contacting and final assembly position with a brush unit of a commutator motor.
Figure 8:
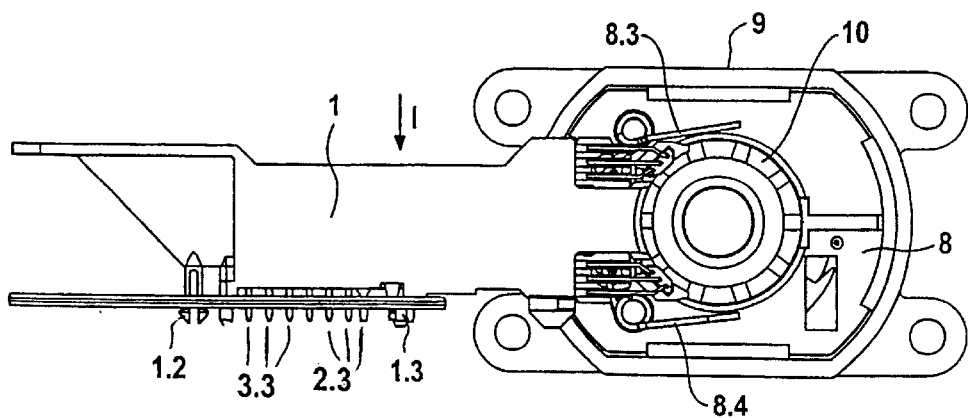
FIG. 8 is a side view of the component according to FIG. 7.

FIGS. 7 and 8 show a plug-in connection system to be improved according to the invention. This connector unit contacts a brush unit 8 on its one connection side and, on its other connection side, contacts a printed circuit board 4 that receives a supply and/or control unit. Only the insulation body 1 of this plug-in connection system is shown here. The insulation body receives contact paths that connect these two connection sides. Of these contact paths, only board-side contact legs 2.3; 3.3, which project from the insulation body 1 and are to be soldered to the board 4, are visible here.

The brush unit 8 is arranged at the open end of a cup-shaped motor housing 9 of a commutator motor and receives tilting brush holders 8.3; 8.4, which sweep against a commutator 10 that is connected to a rotor winding (not shown here) and which receive current from the plug-in connection system. As known from the prior art described above, a gear unit can be flanged to the open end-face of motor housing 9. The drive unit, which includes the commutator motor and the gear unit with the supply and control unit connected thereto via the plug-in connection system, serves e.g. as an actuator for a motor-driven window winder or sunroof drive in a motor vehicle.

Latching hooks 1.2; 1.3, which are molded onto insulation body 1 are used to fix the insulation body 1 mechanically to the board 4. When the insulation body 1 is pushed down in direction 1, these hooks snap into corresponding latching recesses of the board. While insulation body 1 is thus pressed against the upper side of board 4, the contact legs 2.3; 3.3 can be soldered to the board 4. Depending on the thickness of the board, which is determined by applicable tolerances and which defines the reference level, there may be disadvantageous differences in the height position of the plug-in connection system, and consequently its contacts, in relation to the board 4 and in relation to a connector shell that receives the board 4 and connects to the motor housing 8. Furthermore, if the board 4 is in the thin portion of the tolerance range, there is a risk that, as the contact legs 2.3; 3.3 are pushed down and soldered, the latching hooks 1.2; 1.3 remain at a distance and thus without limit stop contact in relation to the underside of the board 4. This means that the contact legs 2.3; 3.3 must additionally act as a mechanical fixation aid, which may exceed their mechanical strength.

Based on these findings, the inventive solution according to FIGS. 1 to 6 advantageously distinguishes over the system just described in that the contact legs 2.3; 3.3 are relieved of mechanical mounting functions. This is achieved by an elastic bracing of the insulation body 1—which in the exemplary embodiment is provided by an elastic tongue 5 integrally molded onto the plastic insulation body 1—in relation to the upper surface of the board 4 in combination with the necessarily ensured limit stop contact of the snapped-in latching hooks 1.2; 1.3, irrespective of the thickness of the board. Thus, despite varying thicknesses of the boards 4, this ensures a constant contact level of the contact paths 2; 3 received by the insulation body 1 and, in particular, their motor-side contact tongues 2.1; 2.2 and 3.1; 3.2, as they contact their associated contact pins 8.1 and 8.2 on the brush unit 8.

In the present example, only two contact paths 2; 3 are provided, preferably embodied as free stampings, to supply a current between the printed circuit board 4 and the brush-side contact pins 8.1 and 8.2. In addition, in the embodiment depicted in FIG. 1, a conventional stator-side rotary speed sensor 1.11 in the form of a Hall transducer, e.g. assigned to a rotor-side magnet wheel 8.5 (see FIG. 7), is arranged on a tongue-like projection of the board 4, which in the final assembly position protrudes into the motor housing 9.

Figure 1:
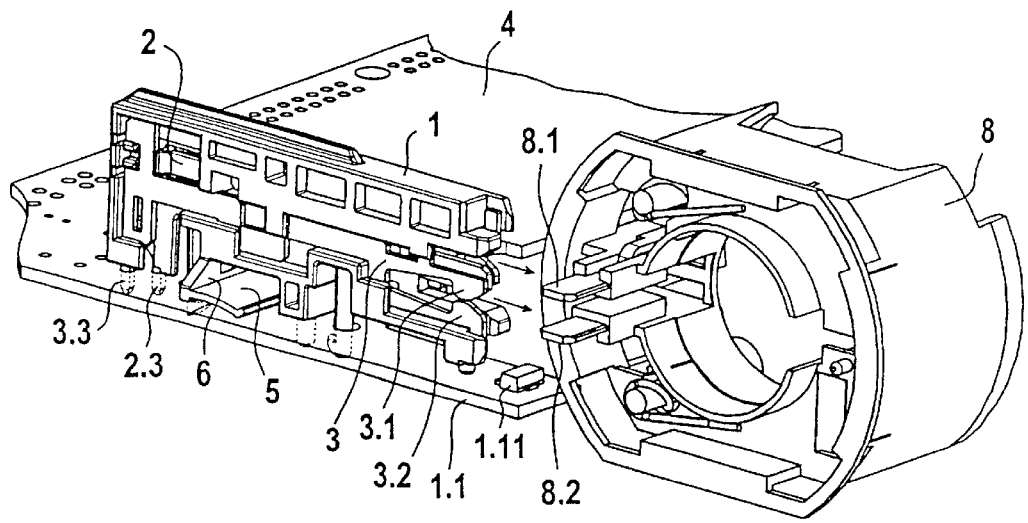
FIG. 1 is a perspective exploded view of a plug-in connection system electrically contacted with and mechanically fixed to a printed circuit board, shown prior to its assembly with a brush unit of a commutator motor.
Figure 2:
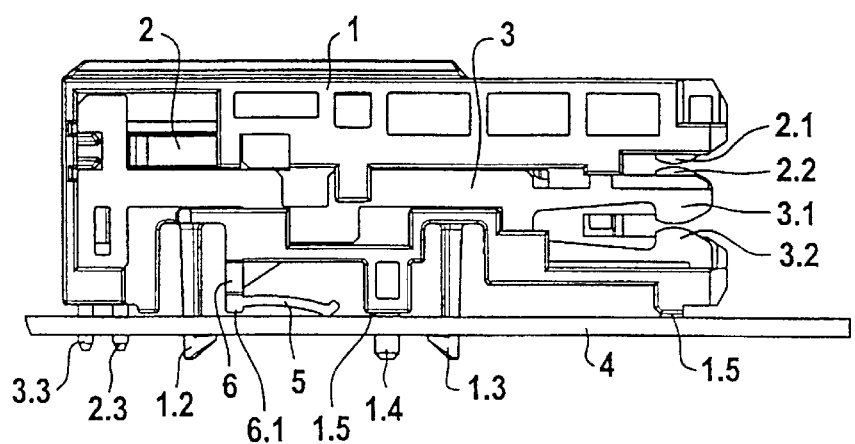
FIG. 2 is a side view of the plug-in connection system of FIG. 1, showing the plug-in connection system contacted with and fixed to the board, in their final mutual assembly position.
Figure 3:
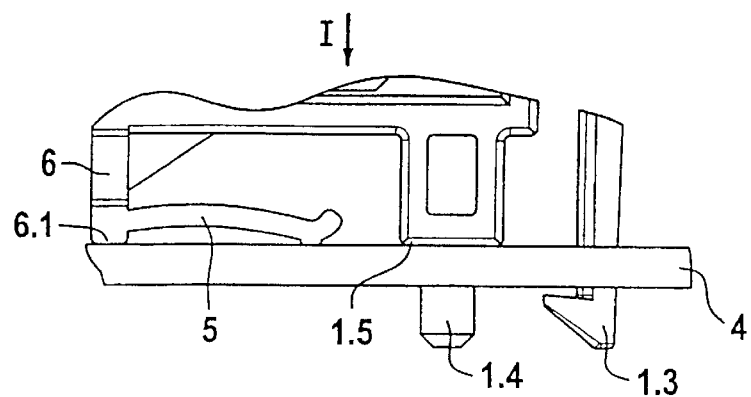
FIG. 3 is an enlarged detail of FIG. 2, illustrating the mutual elastic bracing and positive-fit limit stop between the board and the insulation body in a pre-assembly position with the insulation body being held down against the board.
Figure 4:
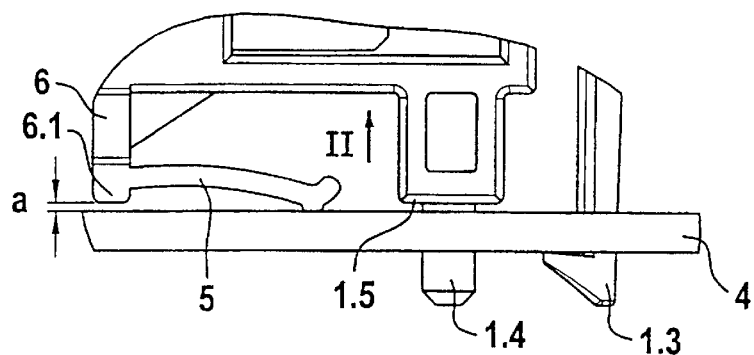
FIG. 4 is an enlarged detail of FIG. 2, showing the mutual elastic bracing and positive-fit limit stop between the board and the insulation body in their final assembly position, with the insulation body being mechanically fixed by the limit stop fitting against the underside of the board.
Figure 5:
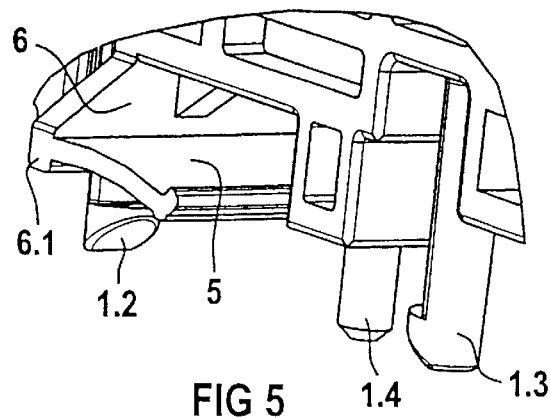
FIG. 5 is a perspective view of the enlarged detail of the insulation body of FIGS. 3, 4.
Figure 6:
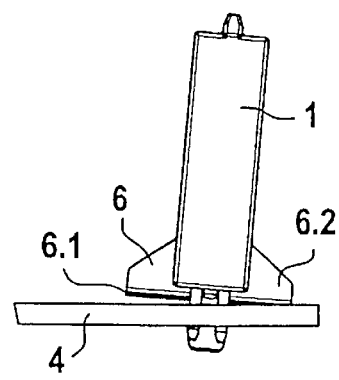
FIG. 6 shows the plug-in connection system secured in a lateral tipping position by a positive-fit lateral support.

FIG. 3 illustrates the position of the insulation body 1 as it is pushed in direction I until it contacts the surface of the board 4 in a positive fit. To achieve this positive fit contact, this embodiment of the invention uses lateral supports 6.1; 6.2 of a web 6, via which the elastic tongue 5 is connected to the insulation body 1, together with further support shoulders 1.5 that project from the insulation body 1 against the printed circuit board 4. Guide pins 1.4 engage with corresponding guide openings in the printed circuit board 4 and thereby serve as mounting aids for assembling the insulation body 1 and its contact paths 2; 3 mounted therein to the board 4.

The contact legs 2.3; 3.3 are soldered to the board 4 while the plug-in connection system 1-3 is held down against board 4 by applying pressure in direction I. Thereafter, the plug-in connection system 1-3 is released such that it is lifted, by the previously braced elastic tongue 5 in direction II, until the latching hooks 1.2; 1.3, which are provided as the only level-defining positive-fit limit stops, contact the underside of the board 4 in a positive fit. As may be seen from the enlarged detail according to FIG. 4, the positive-fit limit stops according to FIG. 3 are pushed with a clearance (a) relative to the surface of the board 4.

According to the embodiments of the invention, easily manufactured lateral supports are provided, particularly for robust assembly handling, for the plug-in connection system 1-3, which is to be mounted on the board 4—here at an approximately 90° angle. For this purpose, according to a first embodiment, the elastic tongue 5 extends perpendicularly to the tilting axis and protrudes laterally, to provide non-positive lateral support. Similarly, the web 6 is provided with positive-fit lateral supports through appropriate shaping of positive-fit lateral supports 6.1; 6.2 on both sides. This is illustrated in particular in FIG. 6, where the right contact edge 6.2, secures the insulation body 1 against lateral tilting. Advantageously, the web 6, with its lateral supports 6.1 and 6.2, acts only subsequent to and supplemental to the non-positive-fit lateral support that is provided by the elastic tongue 5. As such, the supports 6.1 and 6.2 are offset in height or angle such that the positive-fit lateral support acts only if the external tilting forces exceed the non-positive-fit supporting force of the elastic tongue 5.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. Plug-in connection system, comprising:
    an insulation body having a base edge that contacts a printed circuit board when the plug-in connection system is in a final assembly position in relation to the printed circuit board;
    contact paths fixed in a receiving portion of said insulation body and having contact legs that project from the base edge of said insulation body and are positioned to be contacted with the printed circuit board in the final assembly position;
    said insulation body comprising at least one integrally formed elastic tongue that extends substantially perpendicularly to and beyond the receiving portion of said insulation body, and that provides an elastic bracing with respect to the printed circuit board in the final assembly position; and
    said insulation body further comprising at least one integrally formed latching element that latches to the printed circuit board and provides a limit stop contact with a corresponding latching recess in the printed circuit board in the final assembly position.

2. Plug in connection system as claimed in claim 1, wherein said insulation body is angled in non-parallel orientation with respect to the printed circuit board and said contact paths are contacted electrically to the printed circuit board.

3. Plug-in connection system as claimed in claim 1, wherein said contact paths comprise connection elements that are configured to contact with mating connection elements of a component that is electrically connected with the printed circuit board via the plug-in connection system in the final assembly position.

4. Plug-in connection system as claimed in claim 3, wherein said connection elements of said contact paths are positioned at a distal end of said contact paths relative to the contact legs.

5. Plug-in connection system as claimed in claim 3, wherein the component is a motor-gear drive unit.

6. Plug-in connection system as claimed in claim 1, wherein the elastic tongue is configured to provide a non-positive-fit lateral support of the plug-in connection system in relation to an upper surface of the printed circuit board in the final assembly position.

7. Plug-in connection system as claimed in claim 6, wherein said insulation body is a flat insulation body having a narrow side configured to be fixed to and contacted with the printed circuit board.

8. Plug-in connection system as claimed in claim 1, wherein said insulation body comprises at least one web that is configured to provide a positive-fit lateral support of the plug-in connection system in relation to an upper surface of the printed circuit board in the final assembly position.

9. Plug-in connection system as claimed in claim 6, wherein said insulation body comprises at least one web that connects the elastic tongue to said insulation body;
    wherein the web is configured to provide a positive-fit protection against undue tilting of the plug-in connection system in relation to an upper surface of the printed circuit board in the final assembly position; and
    wherein the web is offset by a distance from the upper surface of the printed circuit board, to provide a positive-fit lateral support supplementing the non-positive-fit lateral support provided by the elastic tongue.

10. Plug-in connection system as claimed in claim 1, wherein said insulation body is configured to extend substantially perpendicularly to the printed circuit board in the final assembly position.

11. Plug in connection system as claimed in claim 10, wherein the receiving portion of said insulation body is configured as a flat upright wall part.

12. Plug-in connection system as claimed in claim 1, wherein the receiving portion of said insulation body, the elastic tongue and the latching element are configured as a one-piece plastic component.

13. Plug-in connection system as claimed in claim 12, wherein the one-piece plastic component is produced with mold parts that are drawn along a single axis.

14. Plug-in connection system as claimed in claim 8, wherein the receiving portion of said insulation body, the elastic tongue, the latching element, and the web are configured as a one-piece plastic component.

15. Plug-in connection system as claimed in claim 14, wherein the one-piece plastic component is produced with mold parts that are drawn along a single axis.

16. Plug-in connection system as claimed in claim 1, wherein the plug-in connection system establishes electrical contact between a control unit and power-supply connections of an electric motor drive unit.

17. Plug-in connection system as claimed in claim 16, wherein the electric motor drive unit is a motor-gear drive unit of a motor-driven adjustable closing component in a motor vehicle.

18. An electrical connector plug, comprising:
    at least one power contact track;
    a main insulation body receiving said power contact track and having one side configured to rest against a surface of a circuit board;
    a spring extending from and on the one side of said main insulation body, and configured to press against the surface of the circuit board; and
    a latch extending from and on the one side of said main insulation body, and configured to latch an opposite surface of the circuit board;

wherein said spring additionally extends laterally beyond the one side of said main insulation body.

19. The electrical connector plug according to claim 18, wherein an entire lateral length of said spring contacts the surface of the circuit board.

20. The electrical connector plug according to claim 18, further comprising at least one web extending laterally beyond the one side of said main insulation body, wherein said web is offset away from the surface of the circuit board, relative to said spring, in at least one of height and angle.

21. The electrical connector plug according to claim 20, wherein said web extends laterally flush with said spring.

22. An electrical motor arrangement, comprising:

an electrical motor component;

a printed circuit board; and a plug unit electrically interconnecting said motor component and said printed circuit board;

wherein said plug unit comprises an insulation body having an elastic portion that presses against a near surface of said printed circuit board, having a latch portion that latches against an opposite surface of said printed circuit board, and having a non-elastic portion that is offset away from the near surface of the printed circuit board, relative to the elastic portion, in at least one of height and angle; and wherein the elastic portion is provided between the non-elastic portion and the latch portion.

* * * * *